United States Patent [19]

LaFleur et al.

[11] Patent Number: 5,282,653
[45] Date of Patent: Feb. 1, 1994

[54] COUPLING APPARATUS

[75] Inventors: Karl K. LaFleur; Donald R. Wade, both of Weatherford, Tex.

[73] Assignee: LaFleur Petroleum Services, Inc., Weatherford, Tex.

[21] Appl. No.: 809,755

[22] Filed: Dec. 18, 1991

Related U.S. Application Data

[63] Continuation-in-part of Ser. No. 629,542, Dec. 18, 1990, Pat. No. 5,152,254.

[51] Int. Cl.$^5$ .............................................. F16L 17/03
[52] U.S. Cl. ................................. 285/110; 285/351; 285/379; 285/910
[58] Field of Search ..................... 285/23, 34, 35, 353, 285/386, 314, 315, 364, 379, 88, 340, 351, 110, 910, 111

[56] References Cited

U.S. PATENT DOCUMENTS

| | | | |
|---|---|---|---|
| 1,016,620 | 2/1912 | Gapp . | |
| 1,098,620 | 6/1914 | Gillar . | |
| 1,662,311 | 3/1928 | Hamer . | |
| 1,866,726 | 7/1932 | Santiago . | |
| 2,223,388 | 12/1940 | Scaramucci . | |
| 2,272,812 | 2/1942 | Neal | 285/110 X |
| 2,365,048 | 12/1944 | Bruno | 285/110 X |
| 2,498,915 | 2/1950 | Espegren . | |
| 2,535,694 | 12/1950 | Payne . | |
| 2,620,037 | 12/1952 | McClendon . | |
| 3,011,803 | 12/1961 | Buckner et al. | 285/351 X |
| 3,071,188 | 1/1963 | Raulins . | |
| 3,113,792 | 12/1963 | Brown . | |
| 3,291,442 | 12/1966 | Cranage . | |
| 3,361,453 | 1/1968 | Brown et al. . | |
| 3,545,542 | 12/1970 | Scott . | |
| 3,616,850 | 11/1971 | Scott . | |
| 3,650,549 | 3/1972 | Pepper . | |
| 3,863,716 | 2/1975 | Streich . | |
| 3,874,709 | 4/1975 | MacDonald | 285/340 X |
| 3,915,226 | 10/1975 | Savage . | |
| 3,963,268 | 6/1976 | Widdicombe . | |
| 3,997,198 | 12/1976 | Linder | 285/351 X |
| 4,093,283 | 6/1978 | Weinhold . | |
| 4,124,233 | 11/1978 | Ahlstone . | |
| 4,138,144 | 2/1979 | Pierce | 285/351 X |
| 4,138,145 | 2/1979 | Lawrence . | |
| 4,146,254 | 3/1979 | Turner et al. . | |
| 4,209,193 | 6/1980 | Ahlstone . | |
| 4,209,270 | 6/1980 | Billingsley . | |
| 4,219,226 | 8/1980 | Kappenhagen . | |
| 4,246,967 | 1/1981 | Harris . | |
| 4,278,278 | 7/1981 | Chambless et al. . | |
| 4,290,482 | 9/1981 | Brisco . | |
| 4,433,859 | 2/1984 | Driver et al. . | |
| 4,453,745 | 6/1984 | Nelson . | |
| 4,519,633 | 5/1985 | Nichols . | |
| 4,522,430 | 6/1985 | Stromberg . | |
| 4,524,998 | 6/1985 | Brisco . | |
| 4,541,490 | 9/1985 | Bigbie et al. . | |
| 4,566,168 | 1/1986 | Stromberg . | |
| 4,613,161 | 9/1986 | Brisco . | |
| 4,624,483 | 11/1986 | Stromberg . | |
| 4,751,968 | 6/1988 | Ames et al. . | |
| 4,850,622 | 7/1989 | Suzuki . | |
| 4,895,396 | 1/1990 | Washizu . | |

FOREIGN PATENT DOCUMENTS 0133670 3/1946 Australia .
1038501 9/1958 Fed. Rep. of Germany ...... 285/351

*Primary Examiner*—Dave W. Arola
*Attorney, Agent, or Firm*—Randall C. Brown

[57] ABSTRACT

A coupling apparatus is provided for quick coupling of pumping equipment to a cylindrical member. The coupling apparatus includes at least one sealing member that may be hydraulically biased to provide a fluid tight seal between the coupling apparatus and a cylindrical member.

11 Claims, 3 Drawing Sheets

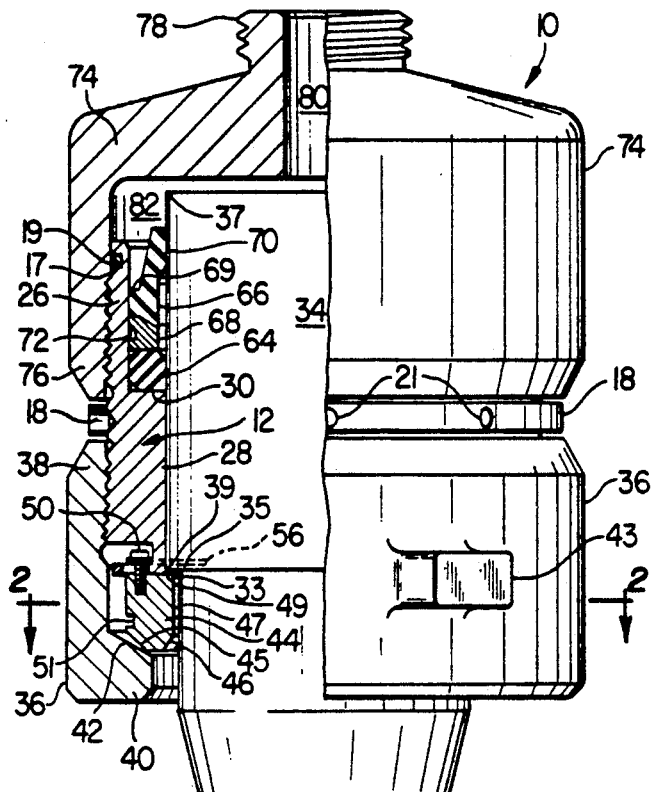
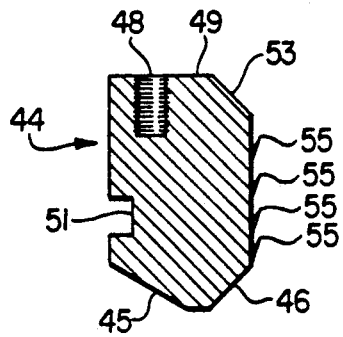
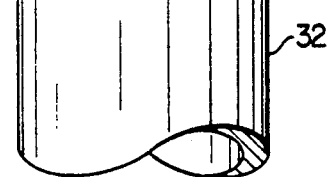
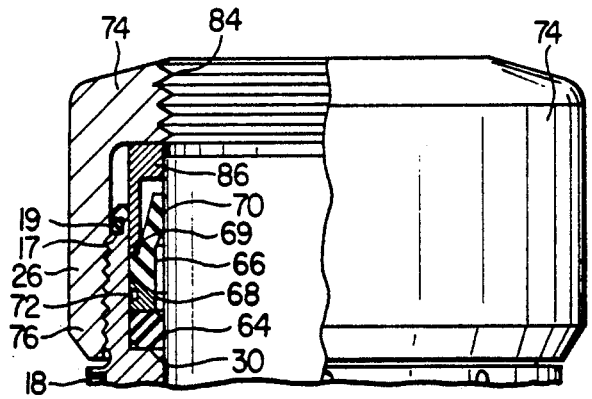
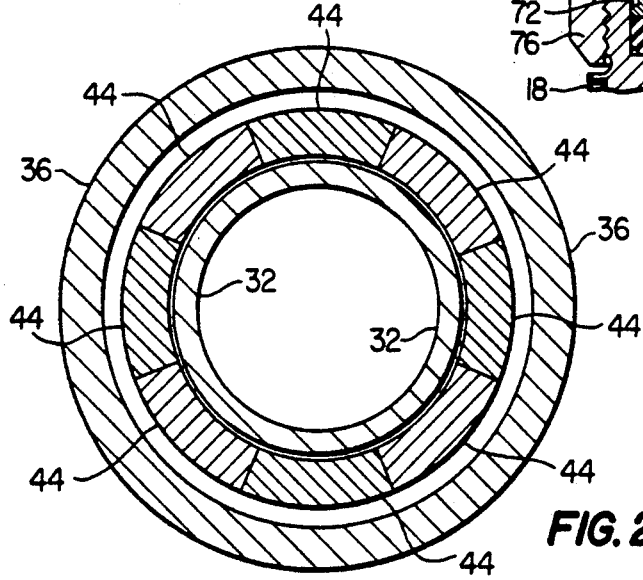

COUPLING APPARATUS

CROSS-REFERENCE TO RELATED APPLICATIONS

This application is a continuation-in-part of patent application Ser. No. 07/629,542 filed Dec. 18, 1990, and now U.S. Pat. No. 5,152,554 issued Oct. 6, 1992, the entire disclosure of which is incorporated herein by reference.

BACKGROUND OF THE INVENTION

1. Field of the Invention

The present invention relates to a coupling apparatus designed to be quickly connected to a cylindrical member, and more particularly to a coupling apparatus for quickly connecting surface pumping equipment to the casing, tubing or drill stem of an oil or gas well.

2. Description of the Prior Art

When casing is being run in connection with the drilling of an oil or gas well, it sometimes becomes necessary to connect surface pumping equipment to circulate drilling fluid down the well. Typically, this need arises when a tight spot is encountered and drilling fluid is circulated down the well to run the casing past the tight spot and avoid the need for removing the casing and redrilling the hole.

According to the prior art, surface pumping equipment is attached by engaging a swadge having a threaded male lower end with the threaded collar of the casing. Many problems are encountered, however, when engaging the swadge and the casing collar. For instance, the top of the casing typically stands as much as fifteen to forty feet above the floor of the drilling rig creating a hazard to personnel who must work at that height to engage the swadge with the casing collar. In addition, the swadges are quite susceptible to cross-threading when engaged to the casing collar sometimes leading to blowouts under high pressure conditions. Finally, engaging the swadge to the casing collar is a time consuming operation.

SUMMARY OF THE INVENTION

The coupling apparatus of the present invention overcomes the above-mentioned drawbacks and disadvantages which are characteristic of the prior art.

The coupling apparatus of the present invention comprises a body member having a cylindrical bore with a first cap means engaged with the body member at a first end thereof and a second cap means engaged with the body member at a second end thereof. A first annular sealing means is disposed within the bore of the body. Optionally, a second annular sealing means is disposed within the bore of the body and engaged with the first annular sealing means. A plurality of locking means are slidingly engaged with the body member and register with the first cap means.

The coupling apparatus of the present invention defines a sealing assembly for sealing against fluid flow through a space defined between a first and a second member. The sealing assembly comprises a first sealing means extending in the space between the first and second members and in the path of the fluid, the first sealing means having first surface means for engagement by the fluid for forcing the first sealing means into a sealing engagement with the first member and second surface means for engagement by the fluid for forcing the first sealing means into a sealing engagement with the second member.

It is preferred that the first surface means of the first sealing means extends at an angle with respect to the first and second members in the space between the first and second members.

It is also preferred that the second surface means of the first sealing means extends perpendicular to the first and second members in the space between the first and second members.

It is also preferred that the sealing assembly include a second sealing means extending in the space between the first and second members and in a spaced relation to the first sealing means.

In one embodiment, the second sealing means is expanded into engagement with the second member when the second surface of the first sealing means is engaged by the fluid and forced toward the second sealing means.

In another embodiment, the second sealing means has first surface means for engagement by the fluid for forcing the first sealing means into a sealing engagement with the first member and second surface means for engagement by the fluid for forcing the second sealing means into a sealing engagement with the second member when the fluid is flowing in a direction that is opposite the direction that causes the first sealing means to sealingly engage the first and second members.

In a preferred embodiment, the coupling apparatus of the present invention comprises a body having a cylindrical bore. The upper end of a cylindrical member may be closely received within the bore of the body. A first annular sealing means is disposed within the bore of the body. Optionally, a second annular sealing means is disposed within the bore of the body. The first annular sealing means may be hydraulically biased against the cylindrical member and the cylindrical bore of the body. If present, the second annular sealing means may be mechanically and hydraulically biased against the cylindrical member and the cylindrical bore of the body. A first cap member having an internally threaded portion is threadedly engaged with a threaded outer surface at a first end of the body. The first cap member includes an inward protruding annular leg having a beveled surface. A plurality of locking means are slidingly engaged within a plurality of slots disposed within a radially outer ring at the first end of the body. The locking means have a beveled surface that registers with the beveled surface of the annular leg of the first cap member. When the first cap member is rotated in a manner to move the first cap member toward a second end of the body opposite the first end of the body, the beveled surface of the annular leg of the body contacts the beveled surface of the locking means, urging the locking means inward toward the cylindrical member so that the locking means register with the cylindrical member to prevent the coupling apparatus from disengaging from the cylindrical member. The coupling apparatus also includes a second cap member having an internally threaded portion which is threadedly engaged with a threaded outer surface at the second end of the body.

Thus, by disposing the coupling apparatus around the cylindrical member, rotating the first cap member until the locking means contact the cylindrical member, and pumping a desired fluid through the apparatus which urges the first annular sealing means and, if present, the second annular sealing means, into their respective sealing positions, the coupling apparatus of the present invention allows the circulation through the cylindrical member of the desired fluid without the possibility of a thread leak or failure.

In an alternate embodiment, the coupling apparatus of the present invention comprises an annular body member having a plurality of teeth extending within the body member for engagement with a cylindrical member and an annular housing extending within the body member and spaced apart from the plurality of teeth. An annular sealing means extends within the body member. The annular sealing means has a first surface means for engagement by a fluid for forcing the annular sealing means into a sealing engagement with the cylindrical member and a second surface means for engagement by the fluid for forcing the annular sealing means into a sealing arrangement with the annular body member.

Numerous objects, features and advantages of the present invention will be readily apparent to those skilled in the art upon a reading of the following disclosure when taken in conjunction with the accompanying drawings.

BRIEF DESCRIPTION OF THE DRAWINGS

FIG. 1 is a perspective view in partial section of a coupling apparatus according to the present invention;

FIG. 2 is a section taken along line 2—2 of FIG. 1;

FIG. 4 is a partial view in partial section of a coupling apparatus according to the present invention;

FIG. 5 is a detail view of a component of the coupling apparatus of FIG. 1;

DESCRIPTION OF THE PREFERRED EMBODIMENTS

Figure 3:
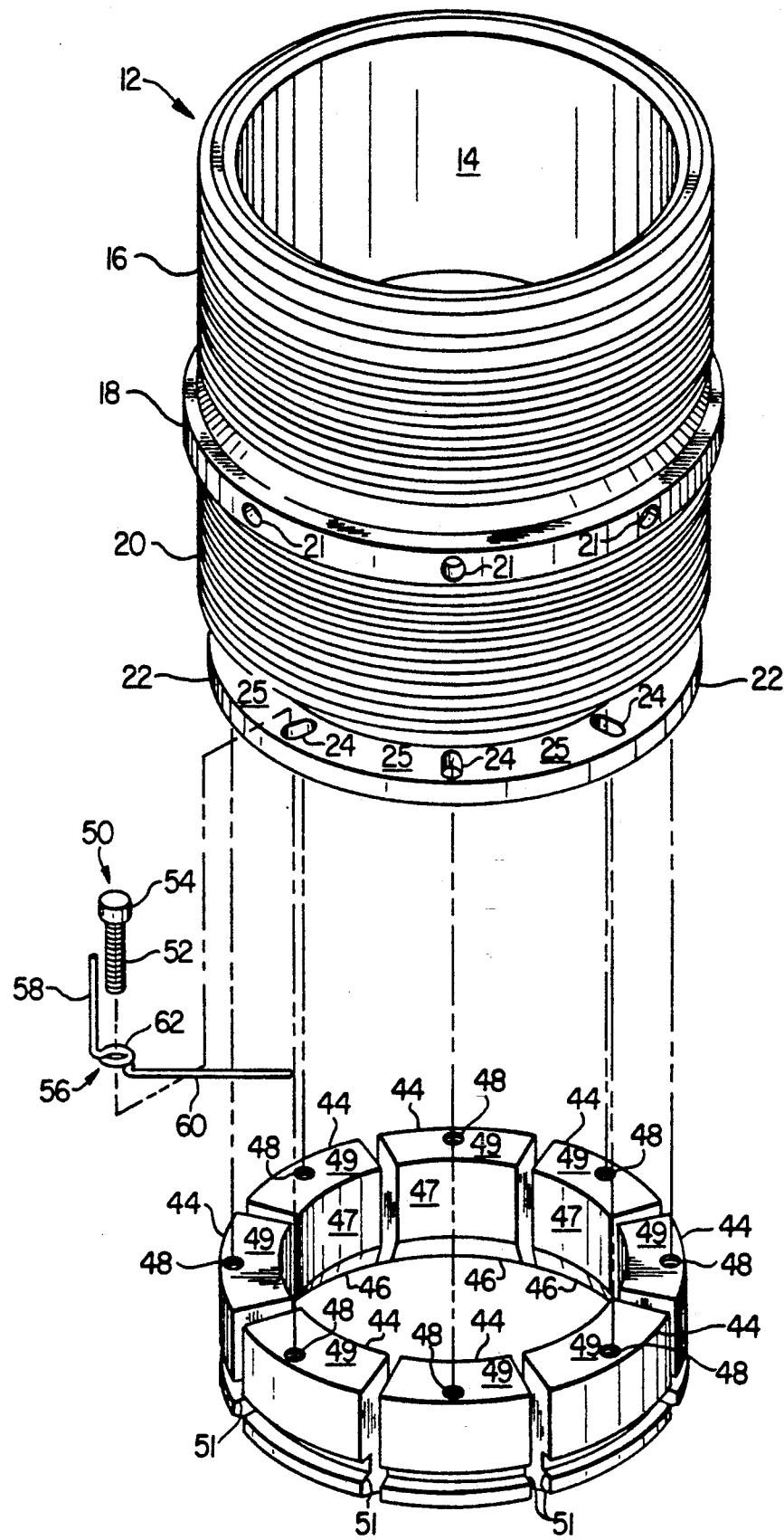
FIG. 3 is a partial exploded view of a coupling apparatus according to the present invention.

Referring now to the drawings, and particularly to FIG. 1, the coupling apparatus of the present invention is shown and generally designated by the numeral 10.

The coupling apparatus 10 may be coupled to any cylindrical member such as the casing, tubing or drill stem of an oil or gas well or any other type of piping or tubular goods. For purposes of description herein all such cylindrical members shall be referred to as tubing. The coupling apparatus 10 may be coupled, preferably, to tubing having a terminal collar.

As shown in FIG. 3, the coupling apparatus 10 includes a body 12 having a cylindrical bore 14, a radially outer upper threaded surface 16, a radially outer intermediate surface 18, a radially outer lower threaded surface 20 and a radially outer ring 22. As shown in FIG. 1, the radially outer upper threaded surface includes an annular groove 17 in which an O-ring 19 is preferably disposed. The radially outer intermediate surface 18 includes a plurality of circumferentially spaced bores 21 in which various tools may be engaged to aid in the handling of the coupling apparatus 10. The radially outer ring 22 has a plurality of slots 24 and an upper surface 25.

As shown in FIG. 1, the inner surface of body 12 defining the cylindrical bore 14 includes an upper portion 26 and a lower portion 28 divided by an inward protruding annular step 30.

As shown in FIG. 1, the coupling apparatus 10 may be disposed about tubing 32 having a radially outer surface 33, and a terminal collar 34. The collar 34 has a shoulder 35, an upper corner 37 and a lower corner 39. The lower portion 28 of the cylindrical bore 14 of body 12 has an inner diameter that is approximately equal to the outer diameter of collar 34 so that the collar 34 is closely received with the lower portion 28 of the cylindrical bore 14 of body 12.

A bottom cap 36 having an internally threaded upper portion 38 is threadedly engaged with the radially outer lower threaded surface 20 of body 12. The bottom cap 36 has an inward protruding annular leg 40 having a beveled surface 42. In addition, the bottom cap 36 may include one or more handles 43 to aid in the handling of the coupling apparatus 10.

A plurality of dogs 44 having a first beveled surface 45, a second beveled surface 46, an inner surface 47, a threaded bore 48 and an upper surface 49 are disposed between the radially outer ring 22 of body 12 and the inward protruding annular leg 40 of bottom cap 36. As shown in FIGS. 3 and 5, each dog 44 may also include a groove 51 to accommodate an O-ring (not shown). Also, as shown in FIG. 5, each dog may include a third beveled surface 53 and a plurality of teeth 55.

As shown in FIG. 3, a screw 50 having a threaded portion 52 and a head portion 54 is threadedly engaged within the threaded bore 48 of each dog 44. Each screw 50 is slidingly engaged within a corresponding slot 24 disposed within the radially outer ring 22 of body 12. To prevent the screws 50 from passing through the slots 24, the outer diameter of the threaded portion 52 of each screw 50 is slightly less than the width of the slots 24 while the outer diameter of the head portion 54 of each screw 50 is greater than the width of the slots 24.

A dog release spring 56 rests upon and is supported by the upper surface 25 of radially outer ring 22. As shown in FIG. 3, each dog release spring 56 includes a first leg portion 58 and a second leg portion 60 which bear against the radially outer lower threaded surface 20 of body 12. The dog release springs 56 are configured to include a bore 62 through which the threaded portion 52 of each screw 50 may pass. The dog release springs 56 thus urge each screw 50 and dog 44 radially outward in relation to the cylindrical bore 14 of the body 12.

As shown in FIG. 1, a first annular sealing means 64 rests upon the inward protruding annular step 30 of body 12. A second annular sealing means 66 rests upon the first annular sealing means 64. The first annular sealing means 64 has a multi-sided cross-section, preferably ranging from octagonal to circular. The second annular sealing means 66 has a lower portion 68 resting upon the first annular sealing means 64, an outward protruding annular leg 69 and an upper portion 70. The lower portion 68 of the second annular sealing means 66 includes an annular groove 72. An O-ring (not shown) is preferably disposed in the annular groove 72. Preferably, the lower portion 68 is rigid and the upper portion 70 is flexible. The upper portion 70 defines an annular ring having an inner diameter approximately equal to the outer diameter of the tubing collar 34. Preferably, the upper portion 70 defines an annular ring having an inner diameter that is less than the outer diameter of the tubing collar 34 to provide an interference fit between the upper portion 70 and the tubing collar 34.

In an alternate embodiment, a third annular sealing means (not shown) is disposed between the first annular sealing means 64 and the inward protruding annular step 30 of body 12. The third annular sealing means has a rectangular cross-section and acts as a vacuum seal. The third annular sealing means also controls extrusion of the first annular sealing means 64.

Figures 6, 7:
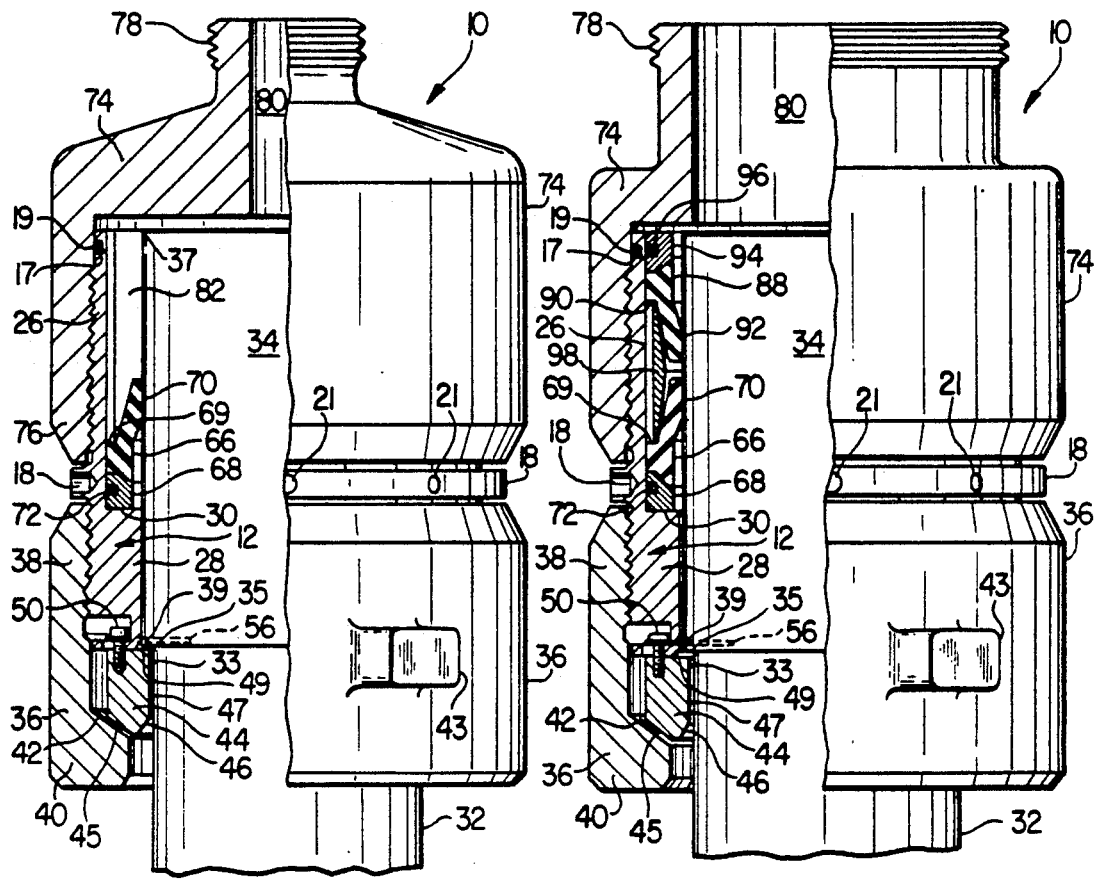
FIG. 6 is a perspective view in partial section of a coupling apparatus according to the present invention.
FIG. 7 is a perspective view in partial section of a coupling apparatus according to the present invention.

In a preferred embodiment and as shown in FIG. 6, the first annular sealing means 64 is omitted and the second annular sealing means 66 rests upon the inward protruding annular step 30 of body 12.

As shown in FIG. 6, the sealing assembly seals against fluid flow through a space 82 defined between the coaxial body 12 and tubing collar 34. The body 12 has a support 30 for supporting and retaining the sealing member 66 in the space 82. The sealing member 66 engages the support 30 and includes first sealing means in the form of an O-ring (not shown) disposed in the annular groove 72, preventing means 68 and second sealing means 70. The first sealing means is engaged with the body 12 and is spaced radially from the tubing collar 34. The second sealing means 70 is engaged with the tubing collar 34. The preventing means 68 is intermediate the first sealing means and the second sealing means 70 and is spaced radially from the tubing collar 34.

A top cap 74 having an internally threaded lower portion 76 is threadedly engaged with the radially outer upper surface 16 of body 12. The top cap 74 also includes a radially outer upper threaded surface 78. The top cap 74, however, can have any desired profile to accommodate any oilfield tools used for pumping of fluids and passage of tools, tubing and wireline. For instance, as shown in FIG. 4, the top cap 74 of the coupling apparatus 10 has an internally threaded upper surface 84 for engagement with a cementing head (not shown). In this manner, the cementing head may be connected to the tubing 32 quickly, easily and safely.

The top cap 74 may also be modified to accommodate a frac head or to pump any fluid or lower instruments within a cylindrical member under pressure.

As shown in FIG. 4, a spacer 86, preferably, is disposed between the outward protruding annular leg 69 of the second annular sealing means 66 and the top cap 74 to centralize the second annular sealing means 66 with respect to the tubing collar 34. The spacer 86 helps to prevent the second annular sealing means 66 from being dislodged from engagement with the first annular sealing means 64 when the coupling apparatus 10 is slipped over the collar 34 of tubing 32.

In another preferred embodiment and as shown in FIG. 7, the first annular sealing means 64 is omitted and the second annular sealing means 66 rests upon the inward protruding annular step 30 of body 12. In this embodiment, a third annular sealing means 88 is disposed between the second annular sealing means 66 and the top cap 74. The third annular sealing means 88 is identical to the second annular sealing means 66 but is inverted with respect to the second annular sealing means 66 so that the outward protruding annular leg 90 of the third annular sealing means 88 is in a facing relationship with the outward protruding annular leg 69 of the second annular sealing means 66. Also, the third annular sealing means 88 includes a first portion 92 that is preferably flexible and defines an annular ring having an inner diameter that is slightly smaller than the outer diameter of the tubing collar 34 to provide an interference fit between the third annular sealing means 88 and the tubing collar 34. Moreover, the third annular sealing means includes a second portion 94 that is preferably rigid and includes an annular groove 96. An O-ring (not shown) is preferably disposed in the annular groove 96. Preferably, a spacer 98 is disposed between the outward protruding annular leg 90 of the third annular sealing means 88 and the outward protruding annular leg 69 of the second annular sealing means 66 to centralize the second annular sealing means 66 and the third annular sealing means 88 with respect to the tubing collar 34. The spacer 98 also maintains the facing relationship between the second annular sealing means 66 and the third annular sealing means 88.

As shown in FIG. 7, the sealing assembly seals against fluid flow through a space defined between the coaxial body 12 and tubing collar 34. The body 12 has a support 30 for supporting and retaining the sealing member 66 in the space. The sealing assembly includes a first sealing subassembly disposed in the space in engagement with the support 30 and including the sealing member 66. The sealing member 66 includes first sealing means in the form of an O-ring (not shown) disposed in the annular groove 72, preventing means 68 and second sealing means 70. The first sealing means is engaged with the body 12 and is spaced radially from the tubing collar 34. The second sealing means 70 is engaged with the tubing collar 34. The preventing means 68 is intermediate the first sealing means and the second sealing means 70. Also, the preventing means 68 is spaced radially from the tubing collar 34.

The sealing assembly also includes a second sealing subassembly disposed in the space and including the sealing member 88. The sealing member 88 includes third sealing means in the form of an O-ring (not shown) disposed in the annular groove 96, preventing means 94 and fourth sealing means 92. The third sealing means is engaged with the body 12 and is spaced radially from the tubing collar 34. The fourth sealing means 92 is engaged with the tubing collar 34. The preventing means 94 is intermediate the third sealing means and the fourth sealing means 92. Also, the preventing means 94 is spaced radially from the tubing collar 34.

The sealing assembly also includes a spacer 98 disposed in the space for limiting movement of the sealing subassemblies toward each other. The spacer 98 is intermediate the preventing means 68 and the preventing means 94.

Figure 8:
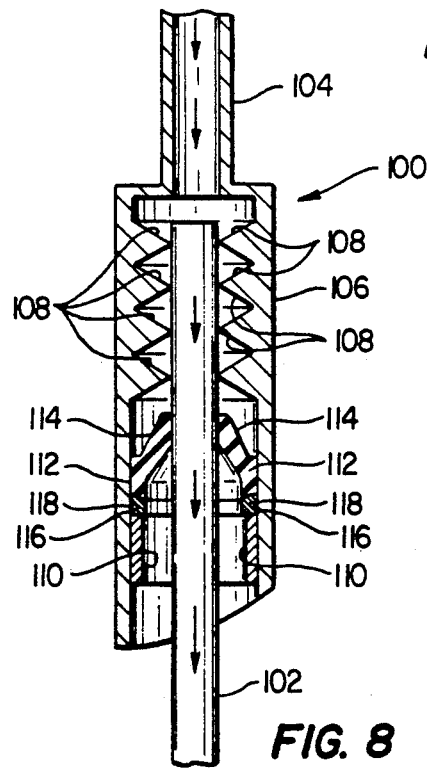
FIG. 8 is a sectional view of a coupling apparatus according to the present invention.

An alternate embodiment is shown in FIG. 8. The embodiment depicted in FIG. 8 is particularly useful as a fishing overshot to grab tubing that has fallen into or broken off in a well and become stuck. Such a stuck piece of tubing will be referred to herein as a "fish."

The overshot device 100 may be used to grab a fish 102 that has become stuck in a subterranean well. The overshot device 100 includes tube 104 that communicates with a fluid supply that is located at the surface of the well. The overshot device also includes a body portion 106 having a plurality of radial teeth 108 and an annular seat 110. An annular sealing means 112 is disposed within body portion 106 and rests upon annular seat 110. The annular sealing means 112 includes a first portion 114 that is preferably flexible and defines a ring having an inner diameter approximately equal to or slightly smaller than the outer diameter of the fish 102, preferably, to provide an interference fit between the annular sealing means 112 and the fish 102. The annular sealing means includes a second portion 116 that is preferably rigid and includes an annular groove 118. An O-ring (not shown) is preferably disposed in the annular groove 118.

In operation, the coupling device 10 is disposed about tubing 32 having a tubing collar 34. The bottom cap 36 is rotated toward the radially outer intermediate surface 18 of body 12 so that the beveled surface 42 of the inward protruding annular leg 40 of bottom cap 36 engages the beveled surface 45 of each dog 44. The rotation of the bottom cap 36 is continued until the inner surface 47 of each dog 44 contacts the radially outer surface 33 of tubing 32 and the upper surface 49 of each dog 44 contacts and engages shoulder 35 of the tubing collar 34. Preferably, when the facing surface 47 and the upper surface 49 of the dogs 44 engage both the radially outer surface 33 of tubing 32 and the shoulder 35 of tubing collar 34, the dogs 44 are in a locking position and comprise a segmented but continuous annular ring as shown in FIG. 2.

In an alternate embodiment, an O-ring (not shown) is disposed within the groove 51 of each dog 44 to urge the plurality of dogs 44 to form a segmented cylinder as shown in FIG. 2. In this manner, when the coupling apparatus 10 is disposed about tubing 32, the second beveled surface 46 of dogs 44 contacts the upper corner 37 of the tubing collar 34 urging the dogs 44 radially outward to allow the coupling apparatus 10 to pass by the collar 34. When the upper surfaces 49 of the dogs 44 clear the lower corner 39 of the tubing collar 34, the dogs 44 are urged inward by the O-ring so that the inner surfaces 47 of the dogs 44 contact the radially outer surface 33 of the tubing 32. This embodiment allows the coupling apparatus 10 to be disposed about tubing 32 with the dogs 44 in locking position over the collar 34 without any manipulation other than the lowering of the coupling apparatus 10 about the tubing 32. Thus, this embodiment is especially suitable for controlling oil or gas well blow-outs or fires. When it is desired to remove the coupling apparatus 10 from the tubing 32, however, the O-ring must be cut.

In another alternate embodiment, the dogs 44 are chamfered as shown in FIG. 5 to include a third beveled surface 53. This embodiment facilitates the passage of the dogs 44 by the lower corner 39 of the collar 34. If the top surfaces of the dogs 49 have not cleared the lower corner 39 of the collar 34, the third beveled surface 46 allows the dogs 44 to slide past the lower corner 39 of the collar 34.

In still another alternate embodiment and as shown in FIG. 5, the dogs 44 are modified to include a plurality of teeth 55 disposed on the inner surface 47. In this embodiment, the coupling apparatus 10 is disposed about tubing 32 that does not include a collar 34. When the dogs 44 are urged toward the tubing 32 the plurality of teeth 55 engage the tubing 32. When upward pressure is exerted on the coupling apparatus 10 the teeth 55 dig into the tubing 32 and prevent the coupling apparatus 10 from being disengaged from the tubing 32.

When surface pumping equipment (not shown) is attached to the radially outer upper threaded surface 78 of top cap 74 and a desired fluid is introduced within the coupling device 10, the fluid first enters passageway 80 and the predominant portion enters tubing 32. However, the fluid is typically pumped under such a high pressure that a certain amount of the fluid will enter chamber 82. In chamber 82 there must be a seal between the coupling apparatus 10 and tubing 32 to prevent blow-outs and leakage. Thus, an O-ring 19 is disposed within groove 17 to provide a seal between the body 12 and the top cap 74. Also, the fluid in chamber 82 hydraulically biases the upper portion 70 of the second annular sealing means 66 against the tubing collar 34 to provide a seal between the second annular sealing means 66 and the tubing collar 34. An O-ring (not shown) is provided in annular groove 72 in the second annular sealing means 66 to provide a seal between the second annular sealing means 66 and the body 12. At a certain pressure, the seal between second annular sealing means 66 and the tubing collar 34 may begin to leak. At this point the fluid exerts a piston-action on the outward protruding annular leg 69 of the second annular sealing means 66 to the extent that the first annular sealing means 64 is deformed to provide a seal between the tubing collar 34 and the body 12. The coupling apparatus 10 has been tested up to a pressure of 9,500 pounds per square inch and no sealing failure has been experienced.

In an alternate embodiment and as shown in FIG. 6, the first annular sealing means 64 is deleted and the second annular sealing means 66 provides an effective seal between the coupling apparatus 10 and tubing 32 to prevent blow-outs and leakage.

In operation, a fluid deforms the first sealing means into sealing engagement with the body 12 at a first predetermined fluid pressure. The second sealing means 70 extends at an acute angle to the direction of the fluid flow so that the fluid deforms the second sealing means 70 into sealing engagement with the tubing collar 34 at a second predetermined fluid pressure. The preventing means 68 d the radial extent of the radial space between the preventing means 68 and the tubing collar 34 prevent the second sealing means 70 from deforming into the radial space.

In a preferred embodiment, the second predetermined fluid pressure is greater than the first predetermined fluid pressure. In another preferred embodiment, the fluid is a liquid and the first sealing means is hydraulically deformed into sealing engagement with the body 12. In still another preferred embodiment, the fluid is a liquid and the second sealing means 70 is hydraulically deformed into sealing engagement with the tubing collar 34.

When the circulation of the desired fluid is completed, the surface pumping equipment is removed from the radially outer upper threaded surface 78 and the coupling apparatus 10 is removed from the tubing 32 by rotating the bottom cap 36 away from the radially outer intermediate surface 18 of body 12 so that the inward protruding annular leg 40 having a beveled surface 42 is moved away from the first beveled surface 45 of the plurality of dogs 44. In this manner, the dog release springs 56 urge the plurality of dogs 44 away from the radially outer lower threaded surface 20 of body 12 so that the upper surfaces 47 of the dogs 44 are released from the shoulder 35 of tubing collar 34. The coupling apparatus 10 may then be removed from tubing 32 and further drilling or pumping activities may be resumed.

In still another alternate embodiment of the present invention, and as shown in FIG. 7, the first annular sealing means 64 is deleted and the third annular sealing means 88 is inverted with respect to the second annular sealing means 88 and disposed between the second annular sealing means 66 and the top cap 74. When surface pumping equipment (not shown) is attached to the radially outer upper threaded surface 78 of top cap 74 and a desired fluid, especially cement, is introduced within the coupling device 10, the second annular sealing means 66 provides an effective seal between the coupling apparatus 10 and tubing 32 to prevent blow-outs and leakage. If a vacuum is created in the chamber 82 during the cementing of tubing located downhole of the coupling device 10, the air sucked within the coupling device 10 biases the first portion 92 of the third annular sealing means 88 against the tubing collar 34 and provides a seal between the third annular sealing means 88 and the tubing collar 34. The seal provided by the third annular sealing means 88 prevents air from being sucked into the coupling device 10 and associated tubing.

In the operation of the embodiment shown in FIG. 7, a fluid moving in a first flow direction deforms the first sealing means into sealing engagement with the body 12 at a first predetermined fluid pressure. The second sealing means 70 extends at an acute angle to the first flow direction so that the fluid deforms the second sealing means 70 into sealing engagement with the tubing collar 34 at a second predetermined fluid pressure. The preventing means 68 and the radial extent of the radial space between the preventing means 68 and the tubing collar 34 prevent the second sealing means 70 from deforming into the radial space associated with the first sealing subassembly. The fourth sealing means 92 extends at an obtuse angle to the first flow direction so that the fourth sealing means 92 allows the fluid moving in the first flow direction to pass thereby. In addition, a fluid moving in a second flow direction deforms the third sealing means into sealing engagement with the body 12 at a third predetermined fluid pressure. The fourth sealing means 92 extends at an acute angle to the second flow direction so that the fluid deforms the fourth sealing means 92 into sealing engagement with the tubing collar 34 at a fourth predetermined fluid pressure. The preventing means 94 and the radial extent of the radial space between the preventing means 94 and the tubing collar 34 prevent the fourth sealing means 92 from deforming into the radial space associated with the second sealing subassembly. The second sealing means 70 extends to an obtuse angle to the second flow direction so that the second sealing means 70 allows the fluid moving in the second flow direction to pass thereby.

Preferably, the second flow direction is opposite the first flow direction.

In a preferred embodiment, the fluid moving in the first flow direction and the fluid moving in the second flow direction comprise the same fluid.

In another preferred embodiment, the fluid moving in the second flow direction comprises air.

In still another preferred embodiment, the fluids are liquids and the first sealing means and the second sealing means 70 are hydraulically deformed into sealing engagement with the body 12 and the tubing collar 34, respectively.

In still another preferred embodiment, the fluids are liquids and the third sealing means and the fourth sealing means 92 are hydraulically deformed into sealing engagement with the body 12 and the tubing collar 34, respectively.

In still another preferred embodiment, the fluids are gases and the third sealing means and the fourth sealing means 92 are pneumatically deformed into sealing engagement with the body 12 and the tubing collar 34, respectively.

All components of the coupling device 10 of the present invention are preferably made from high strength heat treated steel with the exception of the various O-rings, the first annular sealing means 64, the upper portion 70 of the second annular sealing means 66 and the first portion 92 of the third annular sealing means 88 which are preferably made from oil-resistant rubber.

The coupling apparatus 10 of the present invention accommodates tubing having collars of varying sizes and can accommodate all collars that are within API tolerance and most proprietary collars. It is contemplated that the apparatus of the present invention can be modified to accommodate any size tubing with any size collar.

In operation, the overshot device 100 is disposed within a subterranean well containing a fish, such as the fish 102 shown in FIG. 8, that has become stuck within the well. The overshot device 100 is manipulated by techniques known to those of ordinary skill in the art so that fish 102 enters the annular sealing means 112 and the radial teeth 108. The radial teeth 108 are adapted to be of a size that will engage the fish 102.

When a desired fluid is pumped down tubing 104, the fluid is introduced within the overshot device 100 and hydraulically biases the first portion 114 of the annular sealing means 112 against the fish 102 to provide a seal between the annular sealing means 112 and the fish 102. An O-ring (not shown) is provided in annular groove 118 in the annular sealing means 112 to provide a seal between the annular sealing means 112 and the body portion 106 of the overshot device 100. Thus, the annular sealing means 112 provides an effective seal between the overshot device 100 and the fish 102 and allows fluid to be pumped down tubing 104 and into the fish 102. The circulation of fluid through the fish 102 washes away debris that may be holding the fish 102.

All components of the overshot device 100 of the present invention are preferably made from high strength heat treated steel with the exception of the O-ring and the first portion 114 of the annular sealing means 112 which are preferably made from oil-resistant rubber.

While the present invention has been described in detail and with reference to specific embodiments thereof, it will be apparent to one skilled in the art that various changes and modifications can be made without departing from the spirit and scope thereof.

What is claimed is:

1. A sealing assembly for sealing against fluid flow through a space defined between a coaxial first member and second member, said first member having support means for supporting and retaining said sealing assembly in said space, said sealing assembly engaging said support means and comprising first sealing means, preventing means and second sealing means, said first sealing means being engaged with said first member and being spaced radially from said second member, said second sealing means being engaged with said second member, and, said preventing means being intermediate said first sealing means and said second sealing means and spaced radially from said second member, wherein said fluid deforms said first sealing means into sealing engagement with said first member at a first predetermined fluid pressure, said second sealing means extends at an acute angle to said direction of said fluid flow so that said fluid deforms said second sealing means into sealing engagement with said second member at a second predetermined fluid pressure, and said preventing means and the radial extent of said radial space prevent said second sealing means from deforming into said radial space.

2. The sealing assembly of claim 1 wherein said second predetermined fluid pressure is greater than said first predetermined fluid pressure.

3. The sealing assembly of claim 1, wherein said fluid is a liquid and said first sealing means is hydraulically deformed into sealing engagement with said first member.

4. The sealing assembly of claim 1, wherein said fluid is a liquid and said second sealing means is hydraulically deformed into sealing engagement with said second member.

5. The sealing assembly for sealing against fluid flow through a space defined between a coaxial first member and second member, said first member having support means for supporting and retaining said sealing assembly in said space, said sealing assembly comprising:

a first sealing subassembly disposed in said space in engagement with said support means and comprising first sealing means, first preventing means and second sealing means, said first sealing means being engaged with said first member and being spaced radially from said second member, said second sealing means being engaged with said second member, and, said preventing means being intermediate said first sealing means and said second sealing means and spaced radially from said second member, a second sealing subassembly disposed in said space comprising third sealing means, second preventing means and fourth sealing means, said third sealing means being engaged with said first member and being spaced radially from said second member, said fourth sealing means being engaged with said second member, and, said second preventing means being intermediate said third sealing means and said fourth sealing means and spaced radially from said second member, and spacer means disposed in said space for limiting movement of said sealing subassemblies toward each other, said spacer means being intermediate said first preventing means and said second preventing means, wherein a fluid moving in a first flow direction deforms said first sealing means into sealing engagement with said first member at a first predetermined fluid pressure, said second sealing means extends at an acute angle to said first flow direction so that said fluid deforms said second sealing means into sealing engagement with said second member at a second predetermined fluid pressure, said first preventing means and the radial extent of said radial space associated therewith prevent said second sealing means from deforming into said radial space associated with said first sealing subassembly and said fourth sealing means extends at an obtuse angle to said first flow direction so that said fourth sealing means allows said fluid moving in said first flow direction to pass thereby; and, wherein a fluid moving in a second flow direction deforms said third sealing means into sealing engagement with said first member at a third predetermined fluid pressure, said fourth sealing means extends at an acute angle to said second flow direction so that said fluid deforms said fourth sealing means into sealing engagement with said second member at a fourth predetermined fluid pressure, said second preventing means and the radial extent of said radial space associated therewith prevent said fourth sealing means from deforming into said radial space associated with said second sealing subassembly and said second sealing means extends at an obtuse angle to said second flow direction so that said second sealing means allows said fluid moving in said second flow direction to pass thereby.

6. The sealing assembly of claim 5, wherein said second flow direction is opposite said first flow direction.

7. The sealing assembly of claim 5, wherein said fluid moving in said first flow direction and said fluid moving in said second flow direction comprise th ame fluid.

8. The sealing assembly of claim 5, wherein said fluid moving in said second flow direction comprises air.

9. The sealing assembly of claim 5, wherein said fluids are liquids and said first and second sealing means are hydraulically deformed into sealing engagement with said first member and said second member, respectively.

10. The sealing assembly of claim 5, wherein said fluids are liquids and said third and fourth sealing means are hydraulically deformed into sealing engagement with said first member and said second member, respectively.

11. The sealing assembly of claim 5, wherein said fluids are gases and said third and fourth sealing means are pneumatically deformed into sealing engagement with said first member and said second member, respectively.

* * * * *